S. SOKOLOW AND S. POLINSKY.
MEANS FOR FORMING BATTERY ELEMENTS, &c.
APPLICATION FILED JULY 2, 1917.

1,302,722.

Patented May 6, 1919.
10 SHEETS—SHEET 1.

Fig. 1.

INVENTORS:
Samuel Sokolow, Samuel Polinsky,

BY
Geo. W. Miatt
ATTORNEY

S. SOKOLOW AND S. POLINSKY.
MEANS FOR FORMING BATTERY ELEMENTS, &c.
APPLICATION FILED JULY 2, 1917.

1,302,722.

Patented May 6, 1919.
10 SHEETS—SHEET 2.

INVENTORS:
Samuel Sokolow, Samuel Polinsky,
BY
Geo. Wm Miatt
ATTORNEY

S. SOKOLOW AND S. POLINSKY.
MEANS FOR FORMING BATTERY ELEMENTS, &c.
APPLICATION FILED JULY 2, 1917.

1,302,722. Patented May 6, 1919.
10 SHEETS—SHEET 5.

INVENTORS.
Samuel Sokolow, Samuel Polinsky,
BY
Geo. Wm. Miatt
ATTORNEY

S. SOKOLOW AND S. POLINSKY.
MEANS FOR FORMING BATTERY ELEMENTS, &c.
APPLICATION FILED JULY 2, 1917.

1,302,722.

Patented May 6, 1919.
10 SHEETS—SHEET 6.

INVENTORS.
Samuel Sokolow, Samuel Polinsky,
BY
Geo. Wm. Miatt
ATTORNEY

Fig. 15.

ized material by the discharge plun-
UNITED STATES PATENT OFFICE.

SAMUEL SOKOLOW AND SAMUEL POLINSKY, OF NEW YORK, N. Y., ASSIGNORS TO CONRAD HUBERT, OF WHITE PLAINS, NEW YORK.

MEANS FOR FORMING BATTERY ELEMENTS, &c.

1,302,722.     Specification of Letters Patent.     Patented May 6, 1919.

Application filed July 2, 1917. Serial No. 178,115.

*To all whom it may concern:*

Be it known that we, SAMUEL SOKOLOW, a citizen of the United States, and a resident of the borough of Manhattan, city, county, and State of New York, and SAMUEL POLINSKY, a citizen of Russia, (having declared intentions of becoming a citizen of the United States,) and a resident of the borough of Manhattan, city, county, and State of New York, have invented certain new and useful Improvements in Means for Forming Battery Elements, &c., of which the following is a specification.

Our improvements relate to means for effecting the automatic formation of electrodes for dry batteries, etc., after the manner set forth in our copending application Serial No. 150,439, filed Feb. 23, 1917,—our present invention being designed to simplify both the construction and operation of such mechanism, and consisting in the construction and arrangement of parts described and claimed,—distinctive features being the formation of the socket for the carbon rod simultaneously with the primary molding and compression of the depolarizing material which forms the main portion of the body of the electrode, and in the means for attaining greater accuracy in the shape of the final product, all as hereinafter fully set forth.

The terms "tube" and "tubular" as used herein in the specification and claims as referring to the depolarizing material are employed in a broad sense as meaning a hollow or apertured mass not necessarily cylindrical.

In the accompanying drawings,

Fig. 20, is a section taken upon plane of line 20—20, Fig. 16;

Fig. 21, is a perspective view of one of the carbon electrode rods;

Fig. 22, is a perspective view of the tubular agglomerate cylinder without the carbon rod;

Fig. 23, is a perspective view of the finished product as discharged from the apparatus;

Figure 1:
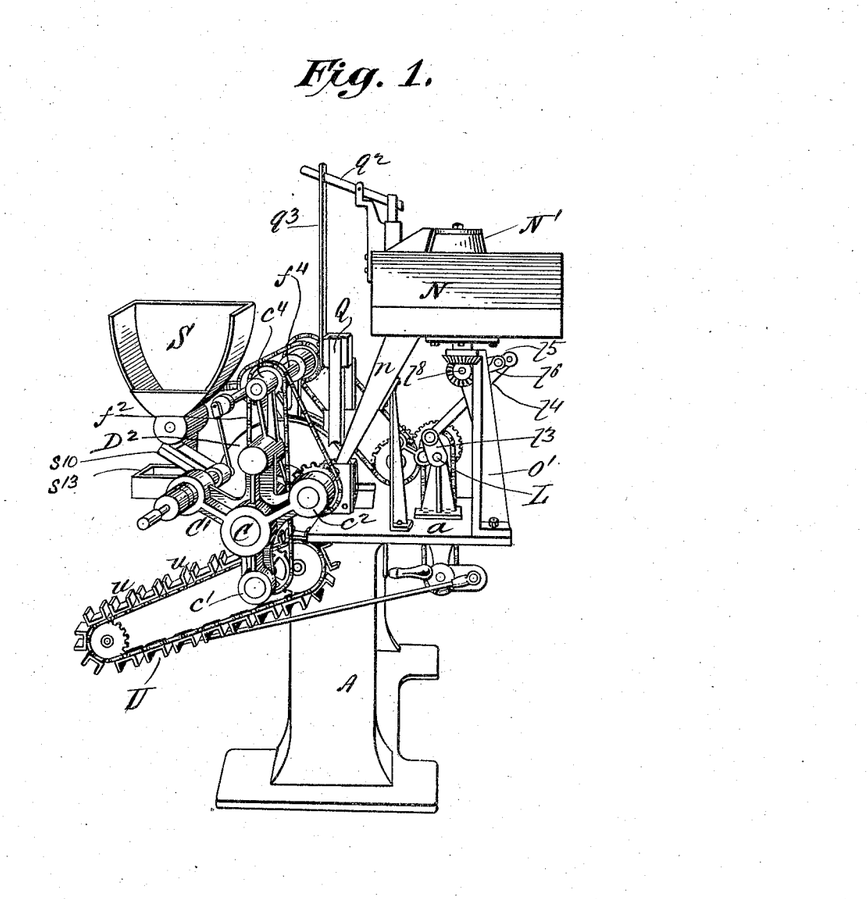
Figure 1, is a perspective view of the front end of apparatus embodying the essential features of our invention.
Figures 2, 3:
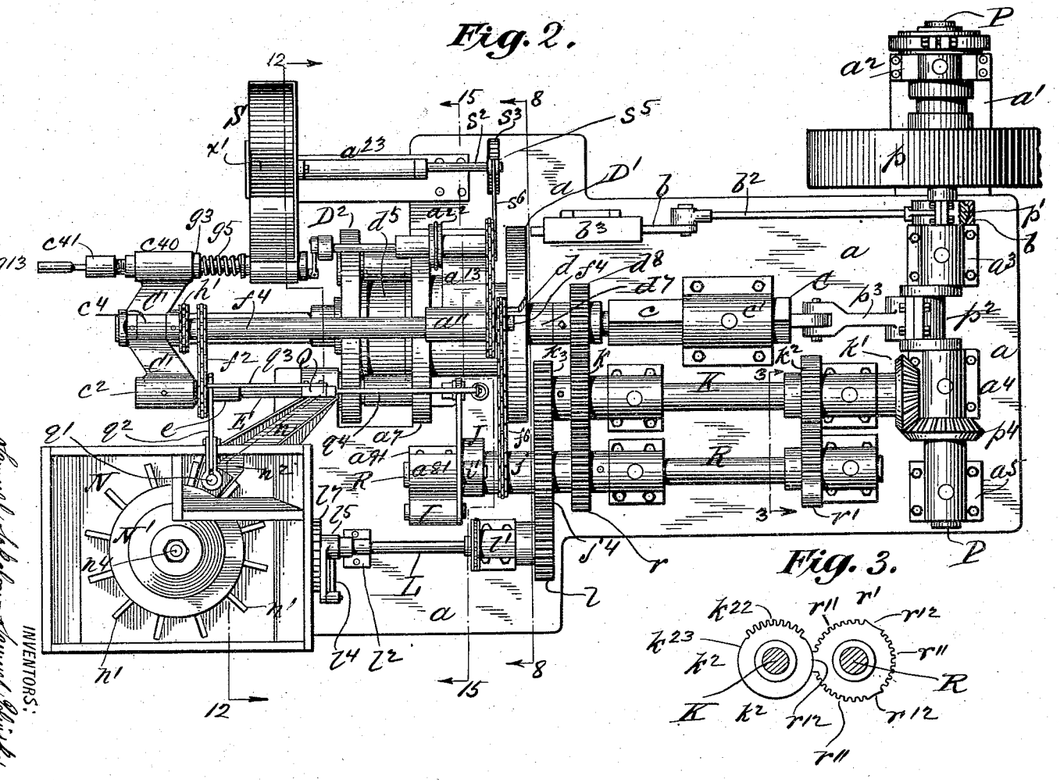
Fig. 2, is a plan of such apparatus.
Fig. 3, is a section on plane of line 3—3, Fig. 2, showing the intermittent gears.
Figure 4:
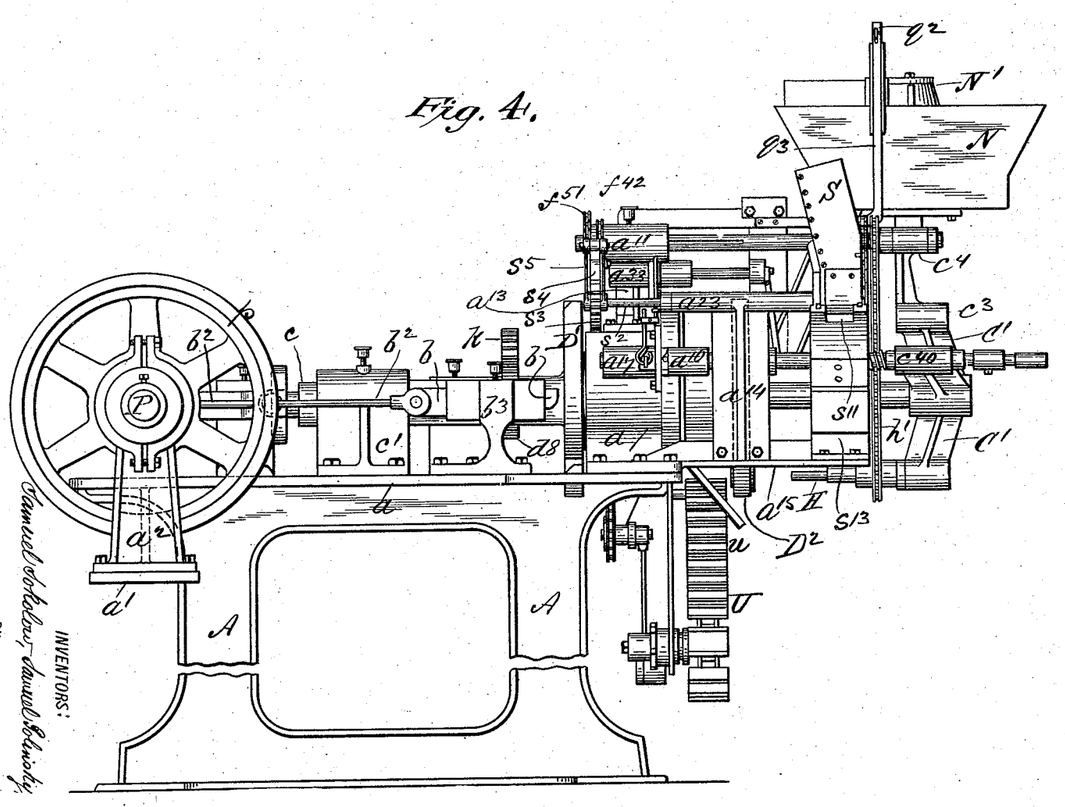
Fig. 4, is a side elevation of the apparatus.

In the drawings A, represents the standard support for the work table $a$, and the bracket $a'$, which latter is on a lower level than the table $a$, and affords support for the bearing standard $a^2$, on which the outer end of the power shaft P, is mounted,—the difference in level between the table $a$, and said bracket $a'$, affording accommodation for the peripheral portion of the power pulley $p$, as shown in Figs. 2, and 4.

Figures 8, 9:
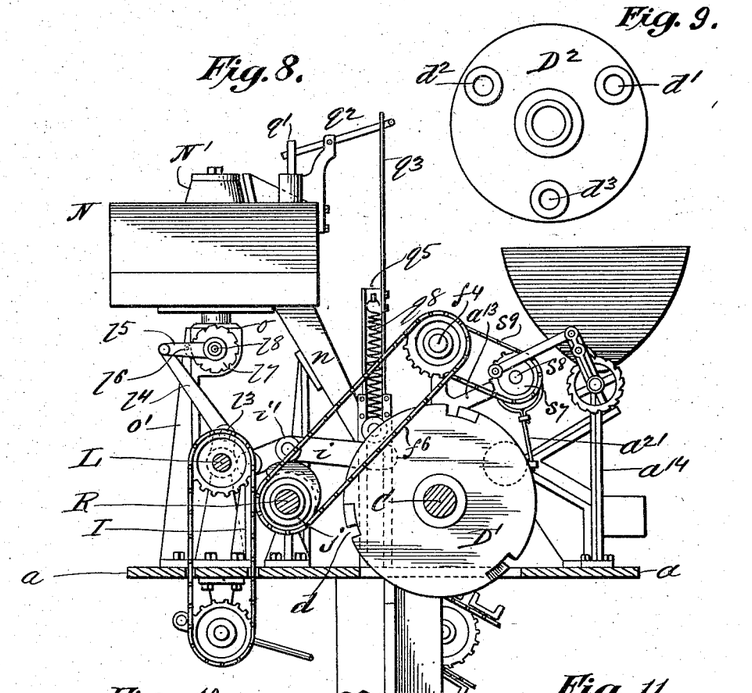
Fig. 8, is a sectional elevation taken upon plane of line 8—8, Fig. 2, and looking toward the front end of the apparatus.
Fig. 9, is a front elevation of the holder transfer disk.

The power shaft is also supported in bearings $a^3$, $a^4$, $a^5$, on the table $a$. An eccentric $p'$, on said power shaft P, operates the bolt $b$, by means of the eccentric sleeve $b'$, (Fig. 2) and pitman rod $b^2$, which latter is pivotally connected to the said bolt $b$. The bolt $b$, is slidably mounted in the standard $b^3$, affixed to the table $a$, and locks the intermittently rotatable transfer member D, while the punches are doing their work as hereinafter set forth,—the outer end of said bolt protruding at the proper time into one of the recesses $d$, (Fig. 8) formed for the purpose in the rear disk D', of said intermittent transfer rotor D, the forward disk D², of which carries the three equidistant cylindrical blank holders $d'$, $d^2$, $d^3$, as shown in Fig. 9.

Figures 5, 6, 7:
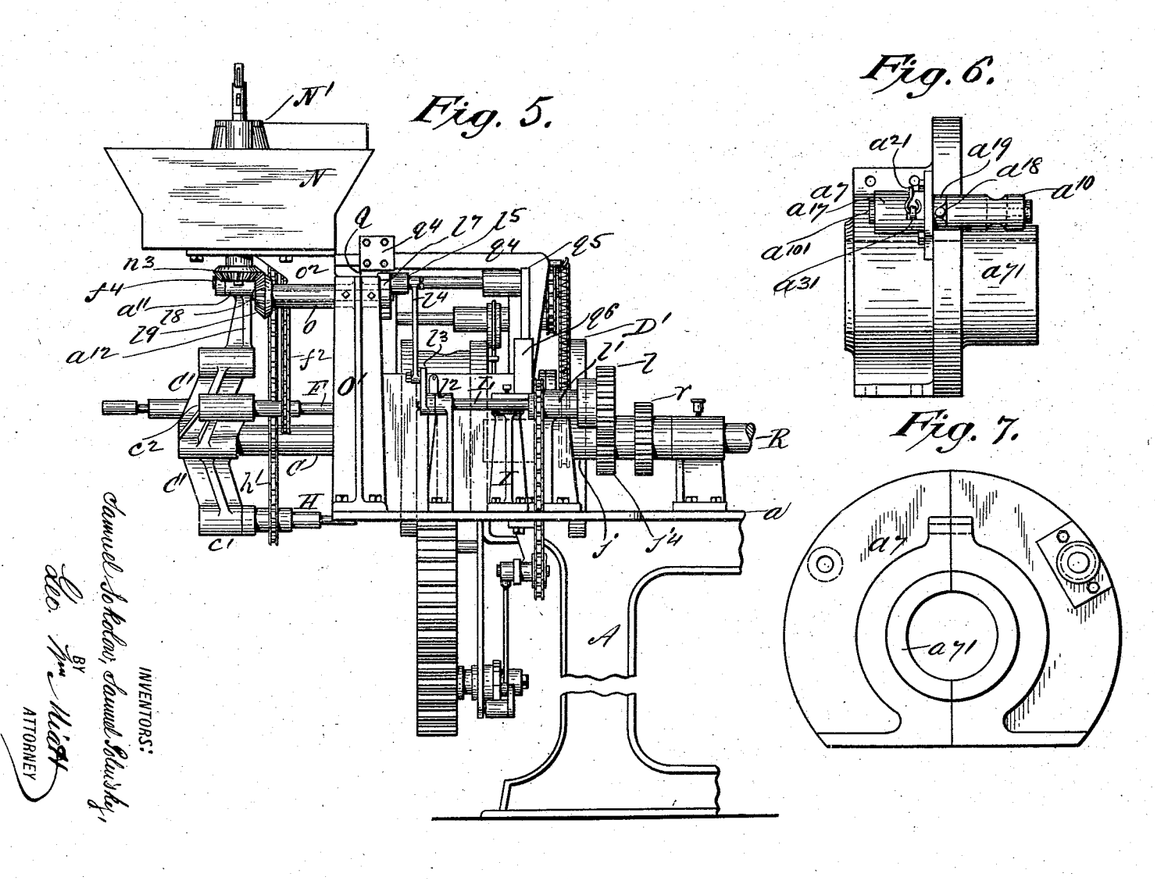
Fig. 5, is an elevation of a portion of the side of the apparatus opposite to that shown in Fig. 4.
Fig. 6, is a side elevation of the main bracket member.
Fig. 7, a rear elevation thereof.
Figure 15:
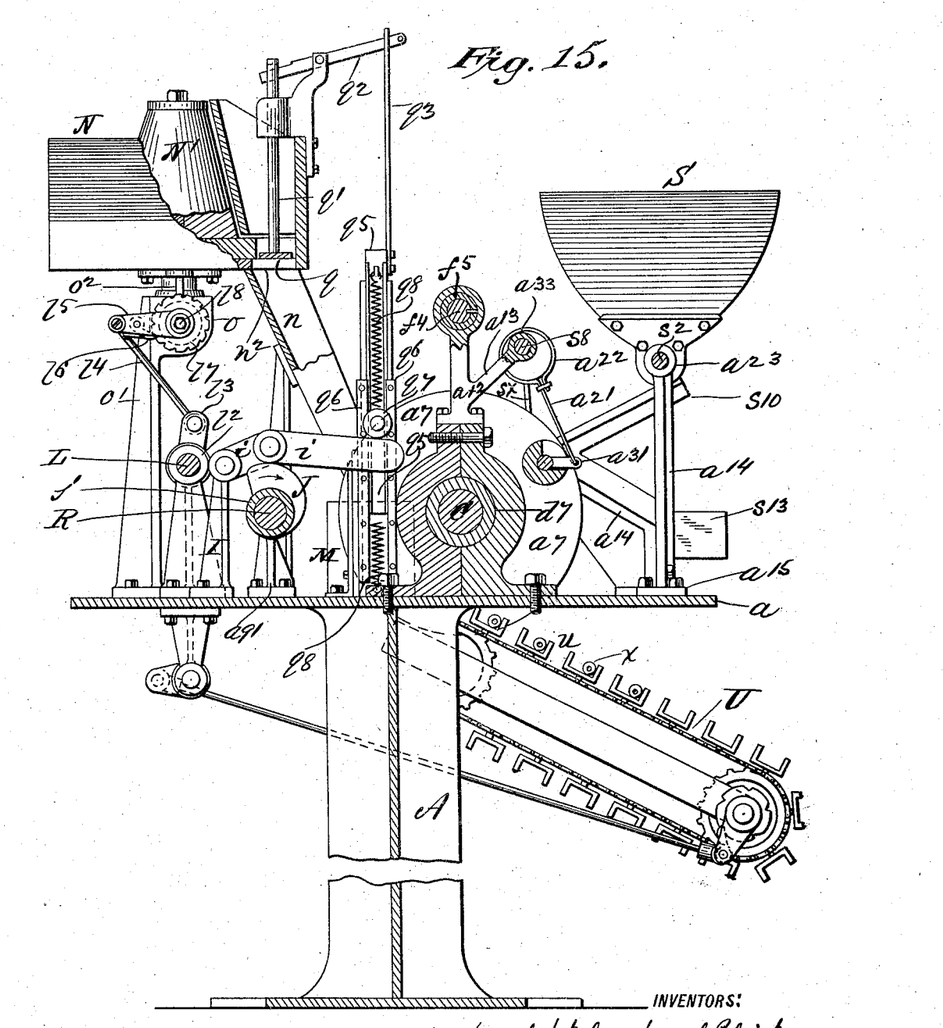
Fig. 15, is a vertical sectional elevation taken upon plane of line 15—15, Fig. 2, looking forward.
Figure 24:
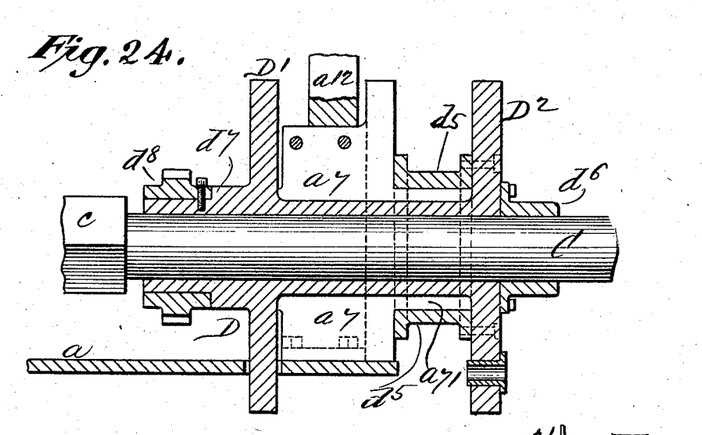
Fig. 24, is a sectional detail of the intermittent rotor or holder carriage etc.

By reference particularly to Fig. 24, it will be seen that the intermittent-rotor-member D, is mounted in a box bracket $a^7$, secured to the table $a$, said box bracket being made in two parts as shown in Figs. 7 and 15, to facilitate the assembling of parts, and being formed with a sleeve extension $a^{71}$, to accommodate a shield sleeve $d^5$, secured to the transfer disk D², and interposed between it and said box bracket $a^7$. The front of the transfer disk D², is also provided with an extension sleeve $d^6$, which also acts as a shield to shed any dust of depolarizing material escaping from the charge holders; and the rear end of the hub $d^7$, of this intermittent rotor member D, has mounted rigidly upon it a gear $d^8$, which meshes with the gear $k$, on the drive shaft K. Said gear $k$, is loose upon the shaft K, and is driven intermittently by the gear $r$, affixed to the intermittently rotatable shaft R, having affixed to it the intermittent gear $r'$, which engages with the intermittent gear $k^2$, affixed to the constantly rotating drive shaft K. These two intermittent gears $k^2$, and $r'$, are shown in detail in Fig. 3, by reference to which it will be seen that the gear $k^2$, has only one toothed peripheral segment $k^{22}$, while the gear $r'$, has three toothed peripheral segments $r''$, the intervening spaces $r^{12}$, being concave and conforming to the toothless peripheral pitch $k^{23}$, of the drive gear $k^2$. Thus the drive gear $k^2$, will rotate three times to effect a complete rotation of the intermittent gear $r'$.

A crank $p^2$, on the power shaft P, effects the reciprocation by means of the pitman $p^3$, of the rod C, which carries the punches, at the forward end of the apparatus, said rod C, extending through the intermittent rotor D, and having mounted upon its forward end the four armed cross head C'. The rear portion $c$, of the slide rod C, is of angular form in cross section, preferably square, and is mounted in a bearing standard $c'$, rigidly secured to the table $a$, and having a bearing and cap adapted to the angular cross section of said rear portion $c$, of the rod C. This structure prevents the turning of the slide rod C, on its longitudinal axis and insures the accurate alinement of the punches E, G, and H, with relation to the receivers or holders $d'$, $d^2$, $d^3$, carried by the forward disk D², of the intermittent rotor D.

Figure 10:
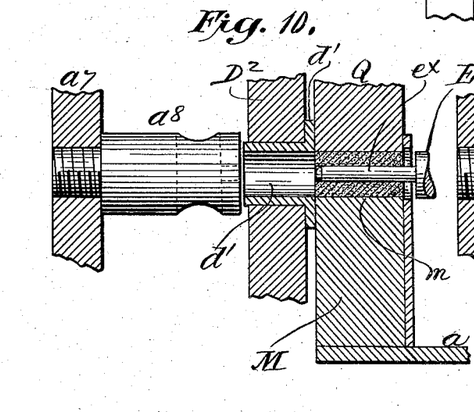
Figs. 10 and 11, are sectional details illustrating the first operation,—that of forming and compressing the cylinder of depolarizing material around the axial tube-forming mandrel and then transferring it to the holder.

The shank $e$, of the punch E, is rigidly mounted in the socket $c^2$, of the cross head C' (Figs. 5 and 10). This punch E, performs a double function in that it supports the mandrel $e^x$, used for the formation of the socket $x^2$, in the cylinder $x$, of compressed depolarizing agglomerate, and also transfers the latter from the matrix $m$, in the mold-block M, into the holder $d'$, in the forwarding disk D², of the intermittent rotor D. By reference to Figs. 10 and 16, it will be seen that in the retracted position of the punch E, the mandrel $e^x$ extends into the matrix $m$, of the mold block M, which is rigidly attached to the table of the machine. The feed of agglomerate to the matrix $m$, and its compression therein is timed to take place during the retractile movement of the cross head C', so that the matrix $m$, will be charged preparatory to the next forward or operative thrust of the punches.

The powdered agglomerate of depolarizing material is fed in loose form to the matrix $m$, through the chute $n$, which receives said agglomerate in moist condition from the hopper N. Rotatably mounted in the latter is the conical feed member N', formed with the radial arms $n'$, which convey the agglomerate to the discharge orifice $n^2$, in the bottom of the hopper. The distance between the adjacent radial arms $n'$, prescribes in a degree the quantity of agglomerate for each charge, and the descent of the latter into the chute $n$, is positively insured by the pusher $q$, attached to the lower end of the rod $q'$, the upper extremity of which is connected with the rock lever $q^2$, which is actuated by the rod $q^3$, attached indirectly to the former Q. The former Q, is rigidly attached to the forward end of the arm $q^4$, (Fig. 5) forming part of the vertical slide $q^5$, the flanged edges of which rest between vertical ways $q^6$, $q^6$, rigidly attached to the table $a$. The vertical slide $q^5$, carries a roller $q^7$, which rests on the rock lever $i$, fulcrumed on the standard I, rigidly attached to the table $a$. The rock lever $i$, carries a roller $i'$, which in turn rests upon the cam J, the hub $j$, of which is mounted loosely on the shaft R, the forward end of which is journaled in the bearing $a^{81}$, on the standard $a^{91}$, also rigidly attached to the table $a$. A spring $q^8$, is attached to the table $a$, and to the upper part of the vertical slide $q^5$, and tends constantly to hold the roller $q^7$, in contact with the rock lever $i$, and the roller $i'$, in contact with the cam J. The latter is rotated continuously, and is formed to provide for the rest of the lever $i$, for about two thirds of the rotation of said cam, the other third, the thrust, being employed to raise the pusher $q$, out of the way of the radial arms $n'$, of the conical feeder N', when the latter is partially turned to effect a fresh feed of agglomerate to the discharge orifice $n^2$. The hub $j$, of the cam J, is formed with a gear $j^4$, which derives its motion from the gear $k^3$, affixed to the main drive shaft K, which is in continuous rotation by reason of the engagement of its miter gear $k'$, with the miter gear $p^4$, on the power shaft P. The cam gear $j^4$, meshes with the gear $l$, on the countershaft L, which is mounted in the bearings $l'$, $l^2$, upon standards attached to the table $a$. To the front end of the countershaft L, is secured the crank $l^3$, to which is pivotally attached the connection rod $l^4$, also pivotally attached to the ratchet lever $l^5$, carrying the pawl $l^6$, which engages with the ratchet wheel $l^7$, which is rigidly attached to the rear end of the shaft $l^8$, which is journaled in the bearing sleeve $o$, (see Fig. 5) forming part of the bracket $o^2$, which supports the hopper N, said bracket $o'$, being rigidly attached to the standard O', secured to the front of the table $a$. To the front end of the ratchet shaft $l^8$, is secured the beveled gear $l^9$, which meshes with the miter gear $n^3$, on the lower end of the spindle $n^4$, on which the conical feed member N', is mounted, as shown more particularly in Fig. 12. The ratchet $l^7$, has twelve teeth corresponding in number to spaces between the radial arms $n'$, on the lower portion of said conical feed member N'; and the rotation of the countershaft L, is so timed, through the intermediate gearing and connections as to cause crank $l^3$, connection rod $l^4$, ratchet lever $l^5$, and pawl $l^6$, to advance the ratchet $l^7$, one notch for each revolution of the power shaft P, thereby turning the conical feed member N', one twelfth of a rotation on its axis, and bringing a fresh charge of agglomerate $x$, into coincidence with the discharge orifice $n^2$, to be ejected therethrough into the chute $n$, by the pusher $q$, operated by the spring $q^8$, when the former Q, has been raised by the cam J, acting through the medium of the roller $i'$, lever $i$, and roller $q^6$, against the action of the spring $q^8$.

Figure 11:
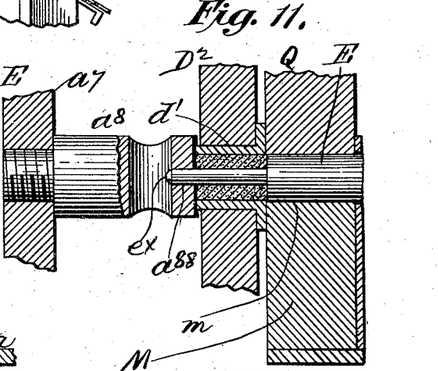

The lower end of the former Q, is formed with a semicylindrical concavity $q^x$, (Fig. 12) to correspond to the semicylindrical matrix $m$, in the mold-block M; and the descent of the former Q, compresses the agglomerate charge of depolarizing material $x$, laterally in the matrix $m$, around the mandrel $e^x$ as illustrated in Fig. 10,—said mandrel $e^x$, being a reduced extension of the forwarding punch E, by which the hollow cylinder of agglomerate thus formed is transferred from said matrix $m$, into the cylindrical holder $d'$, which is in coincidence with said matrix $m$, as shown in Fig. 11.

By a comparative reference to Figs. 10 and 11, it will be seen that the matrix $m$, (including the opposed concave surface of the former Q) is longer than the bore of the holder $d'$, in the carrier $D^2$, and that the transfer plunger E, during the transfer thrust compresses the already laterally compressed charge endwise against the abutment $a^8$, thereby still further compacting the material and reducing the length of the charge to that of said holder $d'$. It will also be noted that the length of the mandrel $e^x$, is greater than that of the matrix $m$, so that near the termination of the forward thrust of the punch E, the outer end of said mandrel $e^x$, will enter the axial bearing $a^{88}$, formed for it in the abutment $a^8$, thereby insuring accurate alinement of the mandrel, and consequently of the socket $x^2$, (Fig. 22) formed thereby.

This feature of positively centralizing the mandrel $e^x$, so as to attain absolute axial alinement of the socket $x^2$, in the body of agglomerate $x$, is an important factor in the production of a perfect product, i. e., a battery element in which the carbon rod $x'$, is in absolute axial alinement as related to the body of depolarizing material $x$, thus rendering the element as a whole more effective and long lived, because any inequality of agglomerate around the carbon rod results in curtailment of efficiency, since the thinner side is the limit of endurance and utility. In other words an element imperfect in this respect "gives out" sooner than one in which the carbon rod is axially positioned and the carbon rod is absolutely correct.

Furthermore by thus forming the socket $x^2$, in the charge $x$, by means of the mandrel $e^x$, during the molding and compression of the charge instead of forming a solid charge and subsequently piercing the same as in our copending application for patent hereinbefore referred to, we obviate all danger of disturbing or loosening up the compressed material by the entrance of the perforating punch, and the displacement of the material to form the puncture.

The bearing $a^{88}$, in the abutment $a^8$, is of a diameter substantially the same as that of the mandrel $e^x$, itself, the difference being only sufficient to admit of the snug entrance of the end of the mandrel into said bearing $a^{88}$; and the end of the mandrel $e^x$, is preferably chamfered or rounded off to facilitate its entrance into said bearing $a^{88}$.

During the formation of the charge $x$, and its transfer to the holder $d'$, as above set forth the punch E, and mandrel $e^x$, are rotated for the purpose of preventing the adhesion of the moist agglomerate thereto, and to render the socket $x^2$, and body $x$, smooth and true. The rotation of the mandrel $e^x$, also compensates for any possible bend or deflection of the mandrel laterally since obviously by such rotation the resultant socket is sure to be of perfect axial alinement.

The rotation of the plunger E, and its mandrel extension $e^x$, is effected by means of the sprocket chain $f^2$, engaging with sprocket teeth on the plunger shank $e$, and on the hub $f^3$, rigidly secured to the rotatable shaft $f^4$. This shaft $f^4$, is mounted in and between a bearing $c^4$, integral with the upper arm of the cross head $c'$, and a bearing $a''$, forming part of a standard $a^{12}$, rigidly attached to the top of the box bracket $a^7$,—the shaft $f^4$, being formed with a longitudinal groove $f^{41}$, for engagement with a key pin $f^{42}$, (see Fig. 20) in the sleeve $f^5$, which is mounted in the bearing $a''$, of the bracket standard $a^{12}$. The key $f^{42}$, and longitudinal groove $f^{41}$, couple the sleeve $f^5$, and shaft $f^4$, so that they rotate together while allowing the shaft $f^4$, to slide longitudinally in said sleeve $f^5$. On the rear end of said sleeve $f^5$, is rigidly attached the sprocket wheel $f^{51}$, which is connected by the sprocket chain $f^6$, with sprocket teeth on the hub $j$, of the cam J. Thus the cam J, and the shaft $f^4$, travel together at the same rate of speed, and transmit the same speed and motion through the medium of the sprocket chain $f^2$, to the plunger shank $e$.

Figure 30:
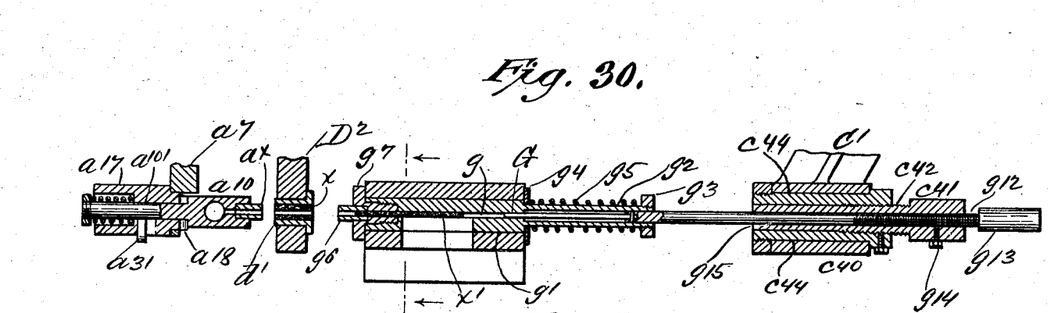
Figs. 30, 31, and 32, are horizontal sectional views illustrating the successive steps in introducing the carbon rod into its socket in the tubular cylinder of depolarizing material.

As the mandrel $e^x$, and forwarding punch E, recede with the cross head C', and other punches mounted thereon, the intermittent rotor D, makes one-third of a turn by reason of the one-third turn of the intermittent shaft R, acting through the gears $r$, $k$, and $d'$, thus carrying the holder $d'$, with the compressed and axially recessed or apertured cylindrical charge $x$, of depolarizing agglomerate over into coincidence axially with the placing punch G, (see Figs. 30 to 32 inclusive) by which the carbon pencil or rod $x'$, Fig. 21) is inserted in the axial socket or aperture $x^2$, formed for it in the "bobbin" or cylinder $x$, by the mandrel $e^x$.

Figures 12, 13, 14:
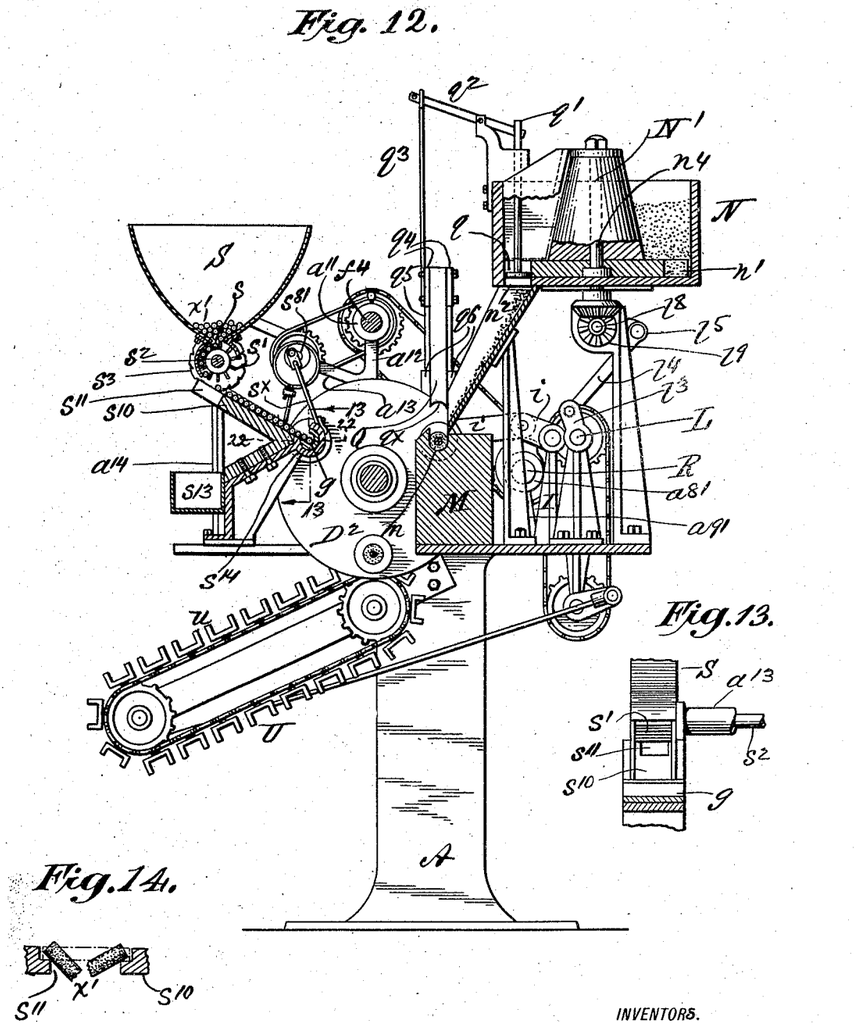
Fig. 12, is a sectional elevation taken upon the irregular line 12—12, Fig. 2, and looking toward the rear of the apparatus.
Fig. 13, is a section upon plane of line 13—13, Fig. 12.
Fig. 14, is a diagram illustrating the function of the exit for broken or defective electrode rods.

The carbon electrode rods $x'$, are fed to the axial pocket $g$, in the sleeve $g'$, in which the forwarding punch G, operates, from a hopper S, which is rigidly supported upon the bearing sleeve $a^{23}$, forming the top of the standard $a^{14}$, which is rigidly attached to the bracket $a^{15}$, which forms a forward extension of the table $a$, (see Fig. 4). The sides of this hopper S, are inclined convergently, as shown in Fig. 12, so as to feed the carbon rods $x'$, by gravity to the central exit port $s$, at the bottom of the hopper, through which exit port $s$, the rods $x'$, descend, one by one, into the pockets of the feed wheel $s'$, which is mounted upon the forward end of the shaft $s^2$, which is journaled in the aforesaid bearing sleeve $a^{23}$, of the standard $a^{14}$, (Figs. 4 and 15) the rear end of said shaft $s^2$, having rigidly attached to it the ratchet wheel $s^3$, which is actuated by a pawl $s^4$, pivotally supported between the twin rock levers $s^5$, $s^5$, (see Figs. 4 and 8) fulcrumed on said shaft $s^2$, said rock levers $s^5$, $s^5$, being oscillated by means of the pitman $s^6$, to which they are pivotally connected, and said pitman $s^6$, being reciprocated by reason of its pivotal connection with the crank-sprocket wheel $s^7$, rigidly mounted on the rear end of the shaft $s^8$, (Fig. 8) which is journaled in the bearing sleeve $a^{33}$, on the end of the extension arm $a^{13}$, of the bracket $a^{12}$, which is rigidly secured to the top of the box bracket $a^7$, as shown particularly in Fig. 15.

The crank-sprocket wheel $s^7$, is connected by a sprocket chain $s^9$, with the sprocket wheel $f^{42}$, on the sleeve $f^5$, of shaft $f^4$, which is slidably mounted, as hereinbefore stated, in said sleeve $f^5$, and the bearing $a''$, on said standard $a^{12}$. Hence the shaft $s^8$, rotates in unison with said slide-shaft $f^4$, which shaft $f^4$, and its sleeve $f^5$, are rotated by the sprocket chain $f^6$, which engages with the sleeve sprocket $f^{51}$, and with the sprocket teeth in the hub $j$, of the cam J. Since the cam J, makes one rotation for each rotation of the power shaft P, as hereinbefore described, it is obvious that through the means of the intermediate sprocket wheels and chains, the shaft $s^8$, and crank sprocket $s^7$, will also rotate once for each rotation of the power shaft and hence the pitman $s^6$, will rock the pawl levers $s^5$, once during that period causing the pawl $s^4$, to advance the ratchet wheel $s^3$, sufficiently to release a carbon rod $x'$, from the hopper.

The latter are thus delivered successively to the inclined way $s^{10}$, by which they are delivered, if perfect, to the axial pocket $g$, in the sleeve $g'$, mounted in the fixed bearing $s^{14}$. If broken or imperfect they drop from the feed wheel $s'$, through the relief exit $s''$, into a receptacle $s^{13}$, provided for the purpose. The relief exit $s''$, is shown in cross detail in Fig. 14, in which a perfect rod is shown in dotted lines as bridging the opening $s''$, with its ends resting on the edges thereof, while in solid lines a defective rod is shown as making its exit through said opening.

As only one rod $x'$, is released from the hopper S, at each one third turn of the carrier disk $D^2$, the inclined way $s^{10}$, is of such length as to accommodate a sufficient number of rods $x'$, to compensate for any broken or defective rods discarded as above stated. That is to say there is always a surplus of rods on said feed way $s^{10}$; the lowest rod in the column resting in the axial groove $g$, with the others in alinement above it.

Figure 31:
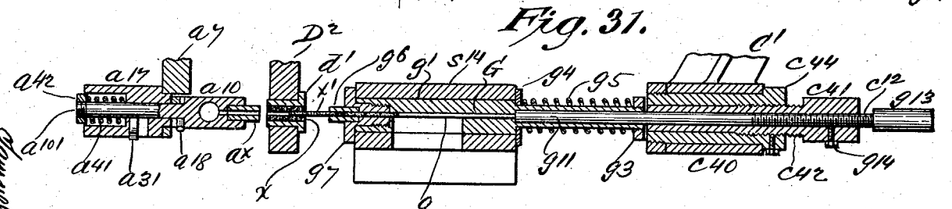
Figure 32:
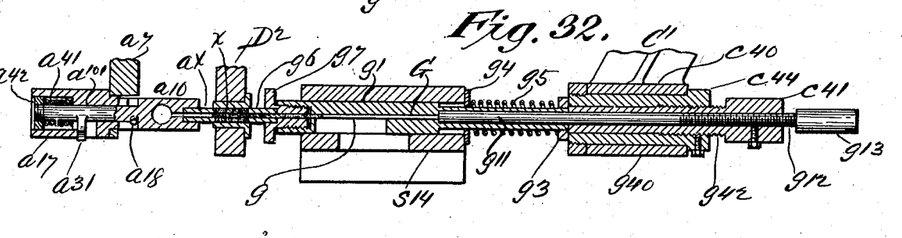

When the punch G, advances it encounters the lowest rod, that in the axial groove $g$, and causes the latter to push the last preceding rod into the aperture in the tubular cylindrical charge in the holder $d'$, as shown in Fig. 31. At this point the head $c^{40}$, of the cross head C', encounters the forward extension $g^2$ of the sleeve $g'$, on which is the collar $g^3$, between which collar $g^3$ and the washer $g^4$, is interposed the coiled spring $g^5$, said washer $g^4$, bearing against the bracket bearing $g$, and closing the bearing in which sleeve $g'$, rests.

The continued advance of the cross head C', presses back the sleeve $g'$, against the resistance of the spring $g^5$, pushing the rod $x'$, farther into the aperture of the tubular cylindrical charge $x$, as shown in Fig. 31, and bringing the tip $g^6$, of the charge presser $g^7$, into contact with the outer end of the charge of agglomerate $x$. At the same time the tip $a^x$, of the abutment $a^{10}$, is advanced into contact with the other end of said charge $x$, the two tips $g^6$, and $a^x$, exerting an endwise pressure thereon and compressing it longitudinally.

During this endwise pressure on the charge $x$, both nipples or tips $a^x$ and $g^6$ are partially rotated on their axes for the purpose of smoothing the ends of the blank and preventing the material thereof adhering to said nipples when they are withdrawn.

Figure 27:
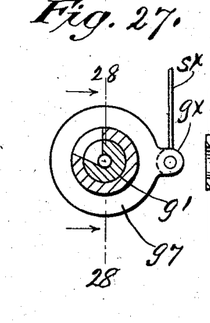
Fig. 27, is a transverse section taken upon plane of line 27—27, Fig. 28.
Figure 28:
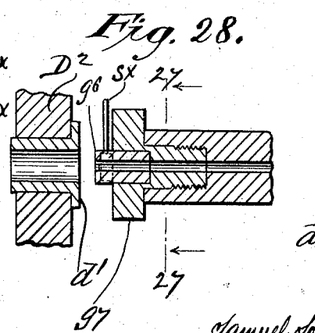
Fig. 28, is a section taken upon plane of line 28—28, Fig. 27.

The stem of the charge presser $g^7$, is threaded to engage with a female screw thread formed for it in the sleeve $g'$, and its partial rotation is effected by means of a pitman $s^x$, pivotally connected with an arm $g^x$, (Fig. 27) of the rod presser $g^7$, and with the crank disk $s^{81}$, (Fig. 12) on the front end of the shaft $s^8$. Thus the partial rotation of the rod presser $g^7$, not only twists the face of the nipple $g^6$, in contact with the the end of the charge $x$, but also, by reason of its screw connection with the sleeve $g'$, causes said nipple $g^6$, to compress the charge longitudinally as before stated with the opposed nipple $a^x$, of the abutment $a^{10}$, as a point of resistance.

Figure 25:
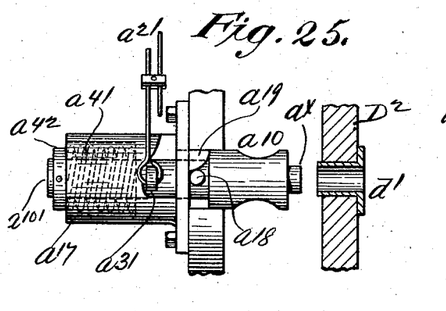
Fig. 25, is a side elevation of a portion of the mechanism for compressing the cylinder of depolarizing material endwise.
Figure 26:
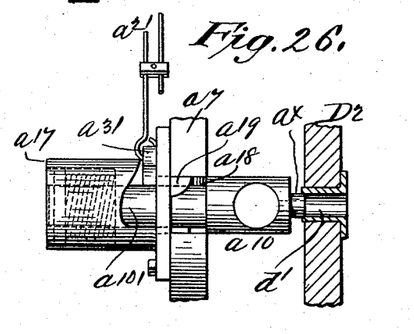
Fig. 26, is a similar view showing the abutment advanced.
Figure 29:
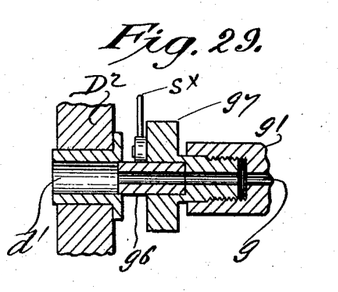
Fig. 29, is a similar view showing the end compressor advanced.

The corresponding partial rotation of the abutment $a^{10}$, is effected by means of a pitman $a^{21}$, pivotally connected to an arm $a^{31}$, on the shank or spindle $a^{101}$, of said abutment $a^{10}$, the upper end of said pitman $a^{21}$, being connected with the strap of an eccentric $a^{22}$, on the shaft $s^8$. The rotation of the eccentric $a^{22}$, causes the pitman $a^{21}$ to rock the abutment $a^{10}$, against the resistance of the spring $a^{41}$, (Fig. 25,) interposed between a nut collar $a^{42}$, on the end of the spindle $a^{101}$, and the bearing sleeve $a^{17}$, rigidly secured to the box bracket $a^7$, and within which said spindle shank $a^{101}$, is mounted. This spring $a^{41}$, tends constantly to draw the abutment $a^{10}$, back with its radial pin $a^{18}$, in contact with the cam surface $a^{19}$, on the bearing sleeve $a^{17}$, as shown more particularly in Figs. 25 and 26, and to hold said pin $a^{18}$, at the rear end of said cam surface. Thus when the eccentric $a^{22}$, raises the pitman $a^{21}$, the pin $a^{18}$, will be forced up the cam surface $a^{19}$, against the resistance of said spring $a^{41}$, thereby not only rocking the nipple $a^x$, to twist its surface in contact with the rear end of the charge of agglomerate $x$, but also advancing said nipple $a^x$, so that it compresses the agglomerate charge $x$, endwise against the resistance of the opposed nipple $g^6$, on the charge presser $g^7$, of the sleeve $g'$, as shown in Fig. 29.

Figures 16, 17, 19:
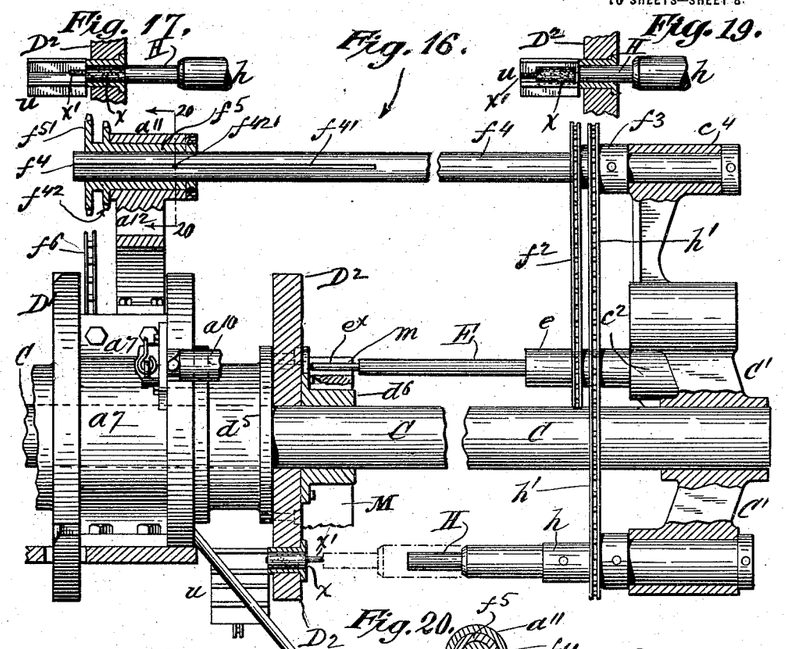
Fig. 16, is a sectional elevation upon a larger scale showing in detail and in retracted positions the parts for effecting the formation of a tubular cylinder of depolarizing material, and also for effecting the completion and discharge of the finished product.
Fig. 17, is a detail view showing the carbon rod forwarded in the cylinder of depolarizing material by the discharge plunger.
Fig. 19, is a detail view similar to Fig. 17, illustrating the actual ejectment of the finished product into the conveyer.
Figure 18:
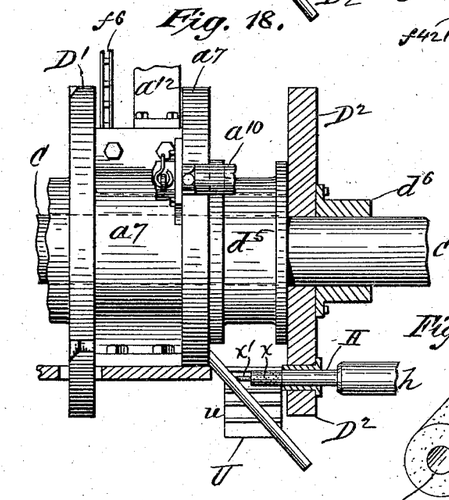
Fig. 18, is a view similar to Fig. 16, showing the action of the discharge plunger in pushing the completed product out of its holder.

The next one-third rotation of the carrier disk $D^2$, brings the holder $d'$, into coincidence with the ejecting punch H. The charge arrives in this position with its rod $x'$, protruding forward as shown in Fig. 16. When the punch H, comes in contact with the protuberant end of the rod $x'$, it forces the latter into the tubular cylindrical charge $x$, so that the rod $x'$, projects to the rear of the charge $x$, and is flush with the front end thereof as shown in Fig. 17. It also contacts with the front end of the cylinder of agglomerate, and for this reason is given a rotary motion to prevent its adherence thereto.

This rotary motion is imparted to the shank $h$, of the punch H, by means of a sprocket chain $h'$, engaging with sprocket teeth on said hub $h$, and on the hub $f^3$, of the shaft $f^4$, as shown in Fig. 16.

The finished bobbins $x$,—$x'$, fall from the holder $d'$, into pockets $u$, of a conveyer U, from which they are removed by hand or otherwise, as may be found most expedient.

The shank $g''$, of the plunger G, is mounted in a bearing sleeve $c^{41}$, supported adjustably in a bushing $c^{44}$, rigidly secured to the socket $c^{40}$, of the cross head C'. Said shank $g''$, is formed with a male thread $g^{12}$, engaging a female thread formed for it in said bearing sleeve $c^{41}$. Said shank $g''$, is also provided with a handle $g^{13}$, or equivalent by which it may be turned to regulate the extent of protuberance of the plunger G. A set screw $g^{14}$, may be used to secure the shank $g''$, in prescribed position.

The bearing sleeve $c^{41}$, is also formed with a male screw thread $c^{42}$, engaging with a female thread formed for it in the bushing $c^{44}$, so that the said sleeve $c^{41}$, may be adjusted in said bushing $c^{44}$, to regulate the protuberance, if any desired, of its inner end $g^{15}$, beyond the inner end of said bushing $c^{44}$, for the purpose of prescribing the operative thrust of the socket $c^{40}$, as related to the forward end of the extension $g^2$, of the sleeve $g'$, and thereby regulating the inward thrust of said sleeve $g'$, as related to the transfer disk $D^2$, and holders mounted thereon. Thus the extent of longitudinal compression exerted against the charge of agglomerate $x$, may be prescribed with accuracy according to the density and compactness required, as well as also a desired predetermined length of the finally compressed charge.

It is obvious that various modifications may be made in the construction shown in the drawings and above particularly described within the principle and scope of our invention.

What we claim as our invention and desire to secure by Letters Patent is,

1. In apparatus of the character designated, in combination, a transfer disk formed with a plurality of equidistant receivers, means for automatically rotating said transfer disk intermittently, a mandrel means for automatically and laterally compressing and molding a charge of comminuted material around the mandrel to form a tubular charge, and means for automatically introducing the tubular, molded and compressed charge thus produced into one of the receivers on said tranfer disk.

2. In apparatus of the character designated, in combination, a transfer disk formed with a plurality of equidistant receivers, means for automatically rotating said transfer disk intermittently, a mandrel, means for automatically and laterally compressing and molding a charge of comminuted material around the mandrel to form a tubular charge, means for automatically introducing the tubular, molded and compressed charge thus produced into one of the receivers on said transfer disk, means for automatically inserting an electrode rod into the tubular charge, and means for automatically discharging the said rod-containing charge from the transfer disk at a subsequent partial rotation thereof.

3. In apparatus of the character designated, in combination, a transfer disk formed with a plurality of equidistant receivers, means for automatically rotating said transfer disk intermittently, a mandrel, means for automatically and laterally compressing and molding a charge of comminuted material around the mandrel to form a tubular charge, means for rotating said mandrel during the compression of the material around it, and means for automatically introducing the tubular, molded and compressed charge thus produced into one of the receivers on said transfer disk.

4. In apparatus of the character designated, in combination, a transfer disk formed with a plurality of equidistant receivers, means for automatically rotating said transfer disk intermittently, a mandrel, means for automatically and laterally compressing and molding a charge of comminuted material around the mandrel to form a tubular charge with the mandrel therein, means for automatically rotating said mandrel during the compression of the material around it, and means for automatically introducing the tubular, molded and compressed charge with the mandrel therein into one of the receivers on said transfer disk and for compressing the charge endwise around said mandrel while in the said receiver of the transfer disk.

5. In apparatus of the character designated, in combination, a transfer disk formed with a plurality of equidistant receivers, means for automatically rotating said transfer disk intermittently, a mandrel, means for automatically and laterally compressing and molding a charge of comminuted material around the mandrel to form a tubular charge with the mandrel therein, means for automatically rotating said mandrel during the compression of the material around it, means for automatically introducing the tubular, molded and compressed charge with the mandrel therein into one of the receivers on said transfer disk, and means for compressing the charge endwise around said mandrel while in the said receiver of the transfer disk and for withdrawing the mandrel for the tubular charge, means operative at a subsequent partial rotation of the transfer disk for automatically introducing an electrode rod into the tubular charge, and means for automatically discharging the said rod-containing charge from the transfer disk at a subsequent partial rotation thereof.

6. In apparatus of the character designated, in combination, a transfer disk formed with a plurality of equidistant receivers, means for automatically rotating said transfer disk intermittently, a mandrel, means for automatically and laterally compressing and molding a charge of comminuted material around the mandrel to form a tubular charge with the mandrel therein, means for automatically introducing the tubular, molded and compressed charge with the mandrel therein into one of the receivers on said transfer disk and for compressing the charge endwise around said mandrel while in the said receiver and including an abutment formed with a centralizing recess for the outer end of the tube-forming mandrel, said introducing and compressing means being adapted to withdraw the mandrel from the tubular charge, means operative at a subsequent partial rotation of the transfer disk for automatically introducing an electrode rod into the tubular charge, and means for automatically discharging the said rod-containing charge from the transfer disk at a subsequent partial rotation thereof.

7. In apparatus of the character designated, in combination, a transfer disk formed with a plurality of equidistant receivers, a mandrel, means for automatically rotating said transfer disk intermittently, means for automatically and laterally compressing and molding a charge of comminuted material around the mandrel to form a tubular charge with the mandrel therein, means including a plunger for automatically introducing the tubular, molded and compressed charge with the mandrel therein into one of the receivers on said transfer disk and for compressing the charge endwise around said mandrel while in the said receiver and including an abutment formed with a centralizing recess for the outer end of the tube forming mandrel, said introducing and compressing means being adapted to withdraw the mandrel from the tubular charge, means for automatically rotating the mandrel and compressing plunger during such endwise compression and withdrawal of the mandrel, means operative at a subsequent partial rotation of the transfer disk for automatically introducing an electrode rod into the tubular charge, and means for automatically discharging the said rod-containing charge from the transfer disk at a subsequent partial rotation thereof.

8. In apparatus of the character designated, in combination, an intermittently rotatable carrier and transfer disk formed with a plurality of receivers, a reciprocatory cross head carrying a plurality of plungers in alinement with said receivers in said transfer disk when the latter is at rest, a mandrel, means for automatically and laterally compressing and molding a charge of comminuted material around the mandrel to form a tubular charge, means including one of said plungers for automatically introducing such tubular, molded and compressed charge into one of the receivers on said transfer disk, means including another of said plungers for automatically inserting an electrode rod into the tubular charge, and means including a third one of said plungers for automatically discharging the said rod-containing charge from the transfer disk.

9. In apparatus of the character designated, in combination, an intermittently rotatable carrier and transfer disk formed with a plurality of receivers, a reciprocatory cross head carrying a plurality of plungers in alinement with said receivers in said transfer disk when the latter is at rest, a mandrel, means for automatically and laterally compressing and molding a charge of comminuted material around the mandrel to form a tubular charge, means including one of said plungers for automatically introducing such tubular, molded and compressed charge into one of the receivers on said transfer disk, means including another of said plungers for automatically inserting an electrode rod into the tubular charge, means including a third one of said plungers for automatically discharging the said rod-containing charge from the transfer disk, and means for automatically locking said transfer disk in position during the working stroke of said reciprocatory cross head and plungers.

10. In apparatus of the character designated, in combination, an intermittently rotatable carrier and transfer disk formed with a plurality of receivers, a reciprocatory cross head carrying a plurality of plungers in alinement with said receivers in said transfer disk when the latter is at rest, a mandrel, means for automatically and laterally compressing and molding a charge of comminuted material around the mandrel to form a tubular charge, means including one of said plungers for automatically introducing such tubular, molded and compressed charge into one of the receivers on said transfer disk, means including another of said plungers for automatically inserting an electrode rod into the tubular charge, means for automatically feeding electrode rods to said rod-inserting means, and means including another of said plungers for automatically discharging the said rod-containing charge from the transfer disk.

11. In apparatus of the character designated, in combination, an intermittently rotatable carrier and transfer disk formed with a plurality of receivers, a reciprocatory cross head carrying a plurality of plungers in alinement with said receivers in said transfer disk when the latter is at rest, a mandrel, means for automatically and laterally compressing and molding a charge of comminuted material around the mandrel to form a tubular charge, means including one of said plungers for automatically introducing such tubular, molded and compressed charge into one of the receivers on said transfer disk, means including another of said plungers for automatically inserting an electrode rod into the tubular charge, means for automatically feeding electrode rods to said rod-inserting means, said automatic feed being formed with a discard exit for the escape of defective electrode rods, and means including a third one of said plungers for automatically discharging said rod-containing charge from the transfer disk.

12. In apparatus of the character designated, in combination, an intermittently rotatable carrier and transfer disk formed with a plurality of equidistant receivers, a mandrel, means for automatically and laterally compressing and molding a charge of comminuted material around the mandrel to form a tubular charge, means for automatically introducing the tubular charge thus formed into one of the receivers of said transfer disk, and means for automatically feeding prescribed charges of said comminuted material to said compressing and molding means.

13. An electrode-making machine of the character designated, comprising a matrix, a mandrel positioned therein, an intermittent feed device operative to feed a charge of depolarizing material into said matrix around said mandrel, means for compressing the depolarizing material in the matrix around the mandrel positioned therein to form a tubular charge, and means for inserting an electrode rod in said tubular charge.

14. An electrode-making machine of the character designated, comprising a matrix, a mandrel positioned therein, a former for laterally compressing depolarizing material around the mandrel to form a tubular charge, an intermittently rotative carrier, means for inserting said tubular charge in said carrier, an electrode-inserting plunger for inserting an electrode rod in said tubular charge, a plunger for ejecting the completed electrode from said carrier, and means for relatively shifting the carrier and the plungers so as to bring the charge successively into coincidence with said plungers.

15. An automatic machine for forming battery elements, such machine having, in combination, a mandrel, means for molding depolarizing material into a tube around the mandrel, and means for freeing such molded tube from the mandrel and from said molding means.

16. An automatic machine for forming battery elements, such machine having, in combination, means for forming a tube of depolarizing material, means for inserting an electrode rod into said tube, and means for compressing the depolarizing material around the electrode rod and to a predetermined length.

SAMUEL SOKOLOW.
SAMUEL POLINSKY.

Witnesses:
J. A. REID,
THERESA I. HAYES.

Copies of this patent may be obtained for five cents each, by addressing the "Commissioner of Patents, Washington, D. C."